April 11, 1961 S. M. MOBERG 2,978,706

TAG APPLYING APPARATUS

Filed Oct. 20, 1959 9 Sheets-Sheet 1

INVENTOR:
SIGURD M. MOBERG
BY Robert Henderson
ATTORNEY

April 11, 1961 S. M. MOBERG 2,978,706

TAG APPLYING APPARATUS

Filed Oct. 20, 1959 9 Sheets-Sheet 2

INVENTOR:
SIGURD M. MOBERG
BY
Robert Henderson
ATTORNEY

INVENTOR:
SIGURD M. MOBERG
BY Robert Henderson
ATTORNEY

April 11, 1961 S. M. MOBERG 2,978,706

TAG APPLYING APPARATUS

Filed Oct. 20, 1959 9 Sheets-Sheet 4

INVENTOR:
SIGURD M. MOBERG
BY Robert Henderson
ATTORNEY

INVENTOR:
SIGURD M. MOBERG
BY Robert Henderson
ATTORNEY

April 11, 1961 S. M. MOBERG 2,978,706

TAG APPLYING APPARATUS

Filed Oct. 20, 1959 9 Sheets-Sheet 6

INVENTOR:
SIGURD M. MOBERG

BY Robert Henderson

ATTORNEY

April 11, 1961 S. M. MOBERG 2,978,706

TAG APPLYING APPARATUS

Filed Oct. 20, 1959 9 Sheets-Sheet 7

INVENTOR:
SIGURD M. MOBERG
BY Robert Henderson
ATTORNEY

April 11, 1961

S. M. MOBERG 2,978,706

TAG APPLYING APPARATUS

Filed Oct. 20, 1959

9 Sheets-Sheet 8

INVENTOR:
SIGURD M. MOBERG
BY
Robert Henderson
ATTORNEY

INVENTOR:
SIGURD M. MOBERG
BY Robert Henderson
ATTORNEY 2,978,706
Patented Apr. 11, 1961

2,978,706

TAG APPLYING APPARATUS

Sigurd M. Moberg, Pompton Plains, N.J., assignor to E. J. Brooks Company, Newark, N.J., a corporation of New Jersey Filed Oct. 20, 1959, Ser. No. 847,654

21 Claims. (Cl. 1—2)

This invention relates to apparatus for use in applying tags to various types of articles, and more particularly to articles which, at least at the area of application of the tag, are of somewhat soft or meatlike substance which may be gripped between prongs or fingers of a tag which becomes embedded in or clamped upon a surface portion of the article. As this invention is particularly useful and of considerable advantage in applying tags to chickens or other poultry, it is disclosed herein as used for the latter purpose without, however, limiting the invention to a machine or tag usable in pursuit of that particular purpose.

During the past several decades, the practice of applying tags to dressed chickens has grown for several reasons. One reason is that government inspection of chicken-processing plants and of dressed chickens has become quite common. Also, it has been desirable to apply tags to dressed chickens either for grading purposes or to indicate that the chickens have been processed in a government-inspected plant or that the chickens themselves have been inspected. Additionally, some processors of chickens desire to apply tags thereto displaying their name, trademark, etc.

Metal tags for dressed chickens have been preferred over tags of other materials, such as cardboard, probably because metal tags are better able to withstand association with the moist or wet chickens without deteriorating. Such tags for chickens, therefore, have commonly been made of sheet metal and have been of such character that they are clipped to the skin of the chicken by being bent manually to bring the parts of a catch on the tag together in association with the skin so that the tag will be clipped to the skin. Such metal tags heretofore in use can be very easily applied, but the operation of applying them manually in substantial volume entails considerable strain to the operator's hand and is very time-consuming, particularly in that an operator must continually reach into a box or other container for such metal tags and remove them from the container in order to apply them separately to chickens.

It appears to have been the belief that mechanical application of tags to chickens would be impractical, probably because of the very irregular shape of a chicken and because some surfaces thereof are quite hard and bony while other surfaces thereof are soft and skin-or-flesh like. In addition, custom dictates application of tags to certain parts of chickens and it is very difficult to devise mechanisms and tags suitable for use in applying tags to those certain parts.

An important object of this invention, therefore, is the provision of apparatus for applying tags to chickens or the like.

Another important object is the provision of such apparatus which operates automatically.

Another important object is the provision of such apparatus which may easily be arranged for use with existing chicken-handling mechanisms in chicken-processing plants.

Another important object is the provision of an improved chicken tag which lends itself to its automatic affixation to chickens or the like.

Another important object is the provision of a chicken tag having certain portions which coact with tag-orienting mechanisms to cause the tag to enter the tag-applying apparatus only in one certain attitude; and which portions coact with the apparatus to assure satisfactory machine operation and satisfactory tag affixation.

The foregoing and other more or les obvious objects and advantages are derived from the present invention as disclosed, for illustrative purposes, in the accompanying drawings in which.

Figure 1:
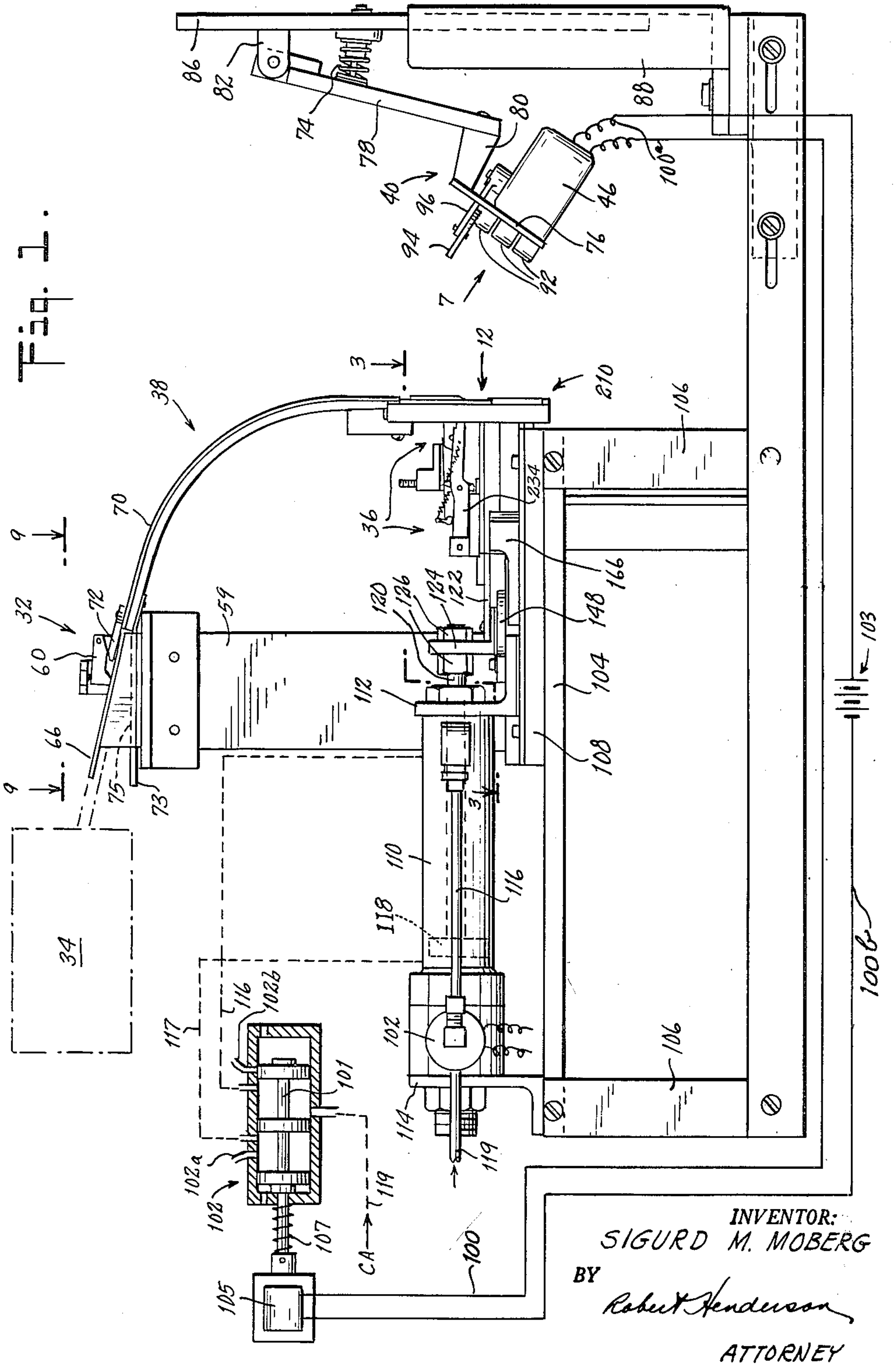
Figure 1 is a side elevational view of tag-applying apparatus according to a preferred embodiment of this invention, including a diagrammatic showing of an air valve and electrical means for operating said valve to control the operation of the apparatus.
Figure 2:
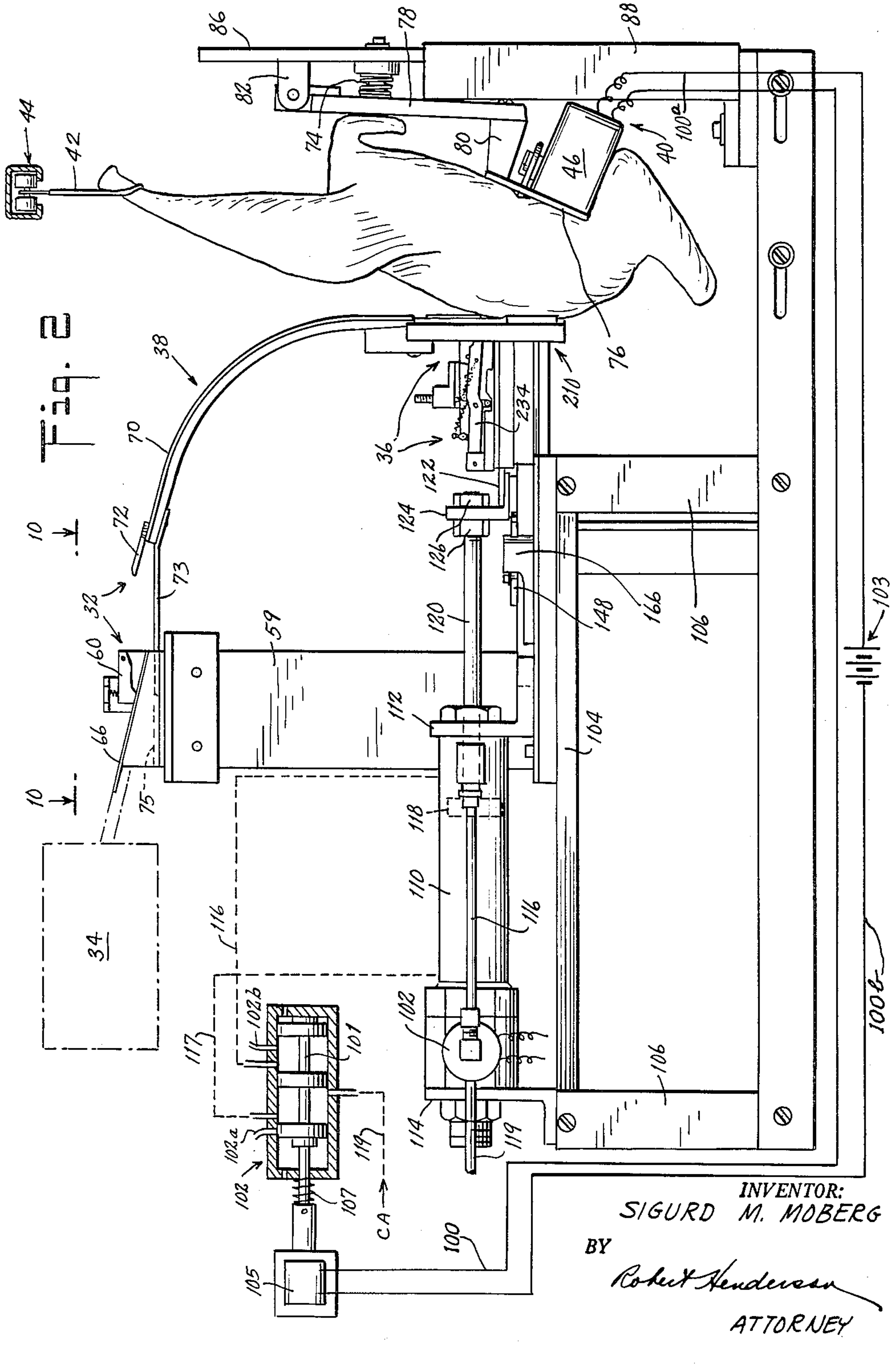
Fig. 2 is a view somewhat similar to Fig. 1, but including also a chicken at the instant of application of a tag thereto.
Figures 18, 20, 21, 21A, 21B:
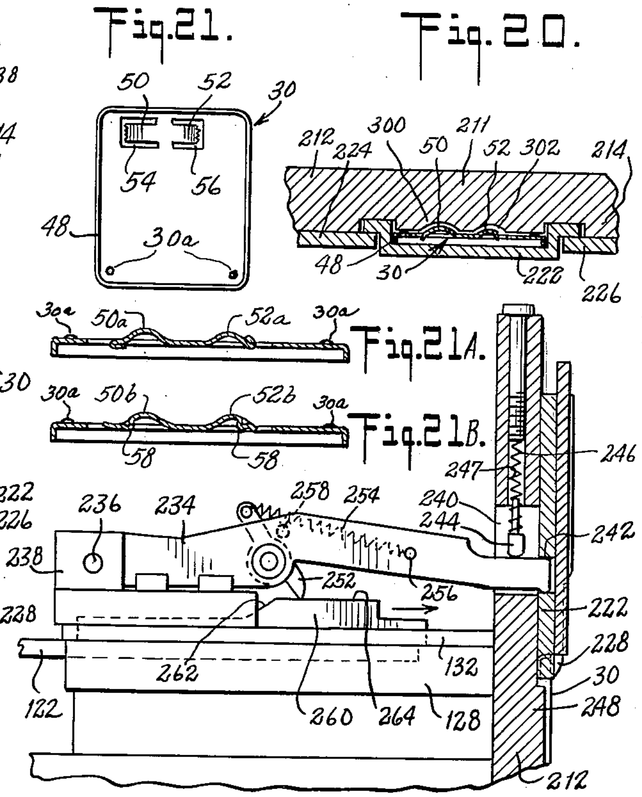
Fig. 18 is an enlarged side view of a shutter-actuating mechanism, largely in elevation but partly in section substantially on the line 18—18 of Fig. 3; a related, releasable, tag-holding shutter being shown in tag-holding position.
Fig. 20 is a fragmentary, horizontal, sectional view, substantially on the line 20—20 of Fig. 16, a tag in this figure being shown in section through prongs thereof by which the tag is affixed to a chicken.
Fig. 21 is an elevational view of the back of said tag.
Figs. 21A and 21B are sectional views through prongs of alternative forms of tags.

A tag according to this invention and suitable for application to a chicken by mechanical means, is shown at 30 in Figs. 20 and 21, and apparatus according to this invention and suitable for mechanical application of a tag to a chicken, is shown generally in Figs. 1 and 2. Such apparatus, includes a combination of coacting components comprising an escapement mechanism or tag-feed-control device 32 which receives tags from an orienting machine diagrammatically indicated at 34; a tag-clinching mechanism 36 which receives tags, by way of a chute 38, from the escapement mechanism; and a yieldable chicken-backing mechanism 40 which engages and backs or supports one side of a dressed chicken while the clinching mechanism 36 presses a metal tag against the opposite side of the chicken and clinches it to the chicken's skin.

To enable one better to understand the apparatus, it should be noted that dressed chickens, suspended by their legs in equidistantly spaced hangers 42 (only one being shown) of a conveyor 44, operated independently of the apparatus employed in this invention, move horizontally in a line perpendicular to Fig. 2 and toward the viewer of said figure until the chicken engages a switch arm of a time-delay switch 46 carried by the backing mechanism 40. Resultant operation of said switch causes the clinching mechanism 36 to move forwardly (rightwardly as viewed in Figs. 1 and 2) until a tag, conveyed to the latter by way of chute 38, is pressed against the chicken and affixed securely thereto, the backing mechanism 40, meanwhile, yielding to some extent. The conveyor 44 preferably operates continuously, although, if desired, it could be controlled to operate intermittently in coordination with the operation of the apparatus of this invention.

The orienting machine has been shown only diagrammatically at 34 as it does not constitute an essential part of this invention.

The tag 30 is preferably formed of relatively thin sheet metal. It may advantageously be square or rectangular in shape, and provided with a continuous, peripheral flange 48 which gives the tag the form of a shallow dish. To enable the tag to be oriented by the orienting machine, prongs 50 and 52, formed by cutting away or at least by slitting of the sheet metal at 54 and 56, are given arcuate form in cross section, as is best shown in Fig. 20. From the latter figure it may be seen that central portions of the prongs 50 and 52 extend appreciably outside of the general plane of the front face of the tag, thereby providing the protuberances necessary to enable a quantity of tags, dumped into the orienting machine, to be so oriented by the latter that they will slide down the chute 38 and be presented properly to the clinching mechanism 36 for affixation to chickens.

It may be noted that the prongs 50, 52 are slightly left of center of the tag as viewed in Figs. 20 and 21. This off-center arrangement of said prongs requires cooperation of a tag in a certain manner with certain parts of the chute and the clinching mechanism, as hereinafter described, to afford a safeguard against entry of the tag into the clinching mechanism in a wrong position or attitude and thereby prevent jamming of that mechanism.

The extremities of the prongs 50 and 52, as shown in Fig. 21, are serrated to enable those prongs to engage a chicken's skin firmly and thereby prevent unintended separation of the tag from the chicken. Serration of said prongs is not essential, however, as the extremities of said prongs may be mere straight edges or somewhat rounded edges, or the prongs may be given alternative forms as shown, for example, in Figs. 21A and 21B.

With a tag as shown in Fig. 21A, prong 50a has its extremity folded against the remainder of said prong at the back thereof, while prong 52a has its extremity folded against the remainder of said prong at the front thereof. In this arrangement, both extremities are non-serrated but are curved somewhat, and when the prongs are interfolded and clinched upon the chicken's skin, as hereinafter explained, the folded extremities face each other and effectively prevent withdrawal of chicken skin from within the prongs.

With a tag as shown in Fig. 21B, prongs 50b and 52b are formed with rearwardly pressed dimples 58 which protrude inwardly with respect to said prongs when the latter are clinched upon the skin of a chicken, so that the protruding sides of the dimples firmly grip the chicken's skin.

As the grip of non-serrated prongs such as are shown in Figs. 21A and 21B is somewhat less pronounced than the grip of the serrations at the ends of the prongs 50 and 52, tags having such non-serrated prongs ordinarily can be more easily removed by a chicken consumer than can a tag with serrated prongs. Also, non-serrated prongs are less likely to damage a chicken's skin by cutting into it.

Any tag for use in this apparatus also preferably should have at least two dimples 30a pressed thereinto in such manner as to form slight protuberances on the same face of the tag from which the arcuate portions of prongs protrude. These protuberances should be substantially spaced from each other and from the prongs, and are provided to avoid sticking of tags together while the tags are in orienting machine 34 or in a hopper portion related to that machine.

The escapement mechanism 32 permits the chute 38 to move forwardly with the clinching mechanism 36 from their Fig. 1 to their Fig. 2 positions, and provides, at the commencement of such forward movement, for automatic discontinuance of feeding of tags gravitating from the orienting machine 34; and upon completion of return movement of the chute, the escapement mechanism provides for resumption of the gravitational supply of tags from the orienting machine to the clinching mechanism.

Figures 6, 7, 8, 9, 10, 11:
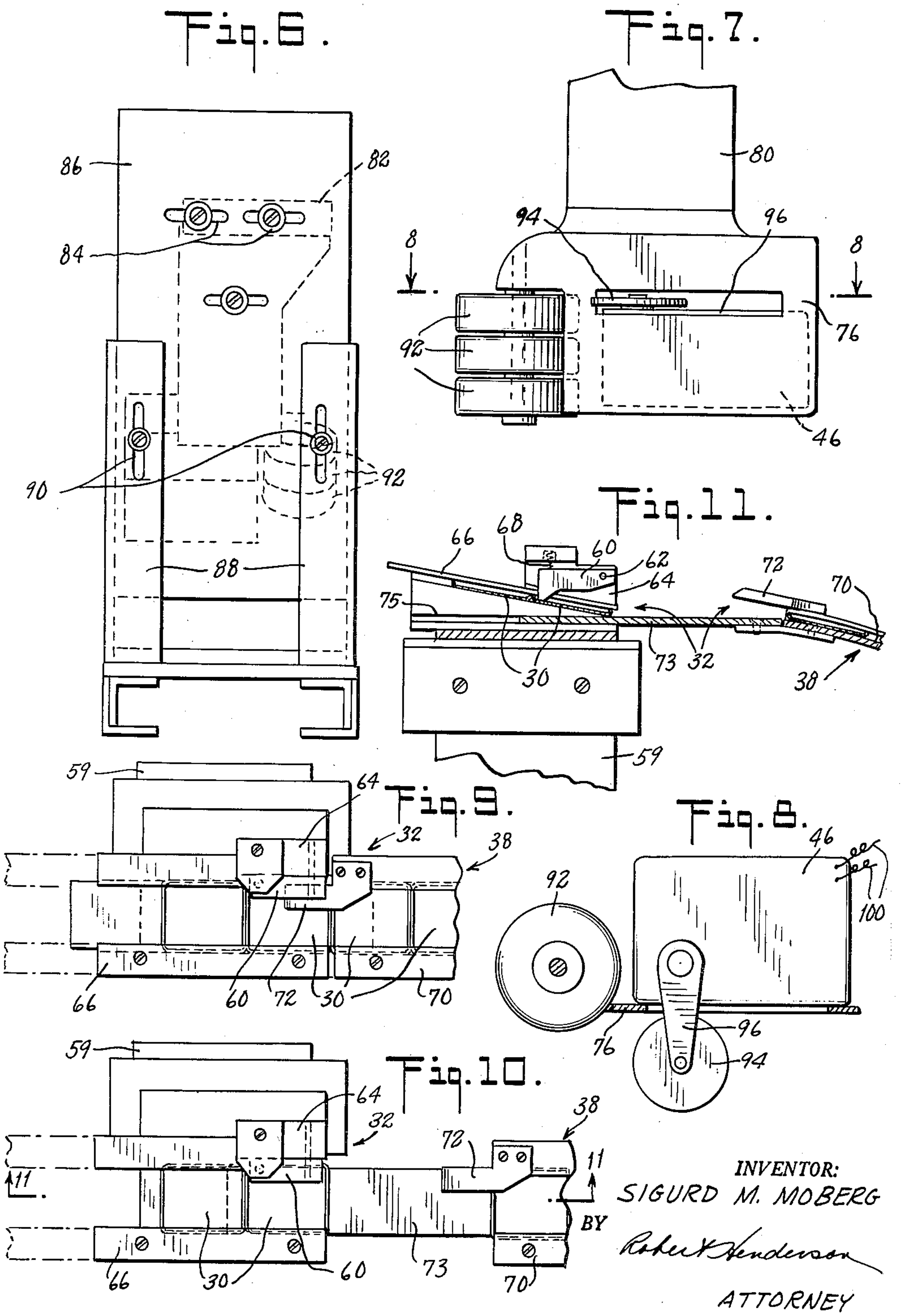
Fig. 6 is a rear elevational view of an adjustable support which serves to support both a chicken-backing member and a switch which controls the operation of the machine.
Fig. 7 is an elevational view of said chicken-backing member and a portion of said switch as viewed in the direction of the arrow 7 in Fig. 1.
Fig. 8 is a sectional view of said chicken-backing member and said switch substantially on the line 8—8 of Fig. 7.
Fig. 9 is a top plan view of an escapement or tag-feed-control device as viewed at the line 9—9 of Fig. 1, said device being shown in this figure in non-blocking position in which it permits unimpeded movement of tags to the main operating parts of the apparatus.
Fig. 10 is a view somewhat similar to Fig. 9 but with said device in blocking position in which it blocks the passage of tags to the main operating parts of the apparatus.
Fig. 11 is a vertical, sectional view substantially on the line 11—11 of Fig. 10.
Figure 12:
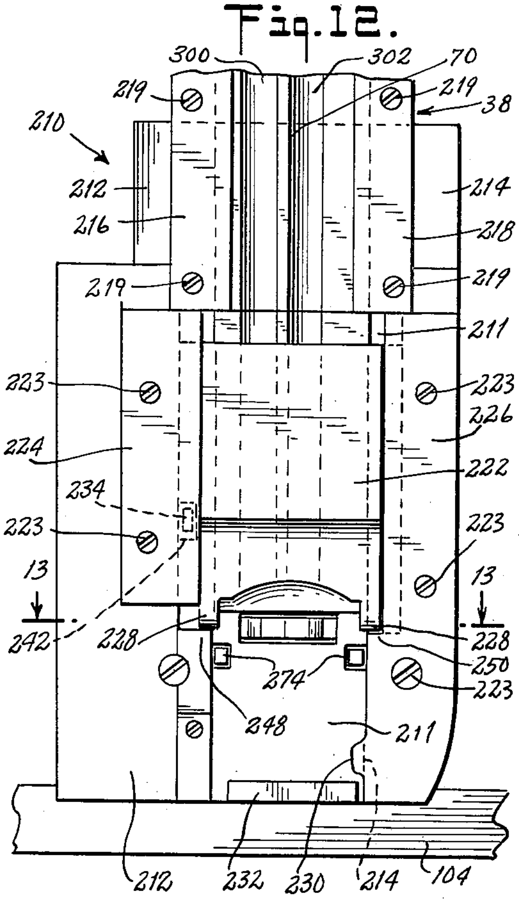
Fig. 12 is an enlarged, elevational view of the front of a tag-applying head as viewed in the direction of the arrow 12 in Fig. 1.
Figure 13:
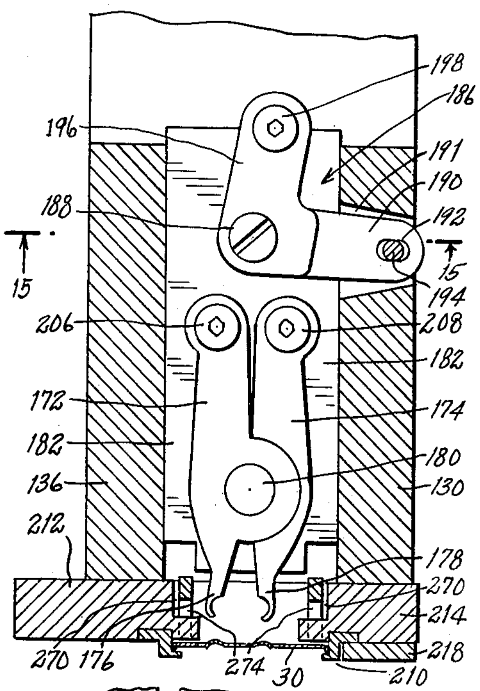
Fig. 13 is a horizontal, sectional view substantially on the line 13—13 of Fig. 12, this view including a plan view of jaws for clinching prongs of a tag into a surface portion of a chicken to affix the tag thereto; and includes also a portion of means for operating said jaws.

The escapement mechanism, best shown in Figs. 9, 10 and 11, is mounted on a support 59 and comprises a dog or pawl 60, pivoted at point 62 to a bracket 64, which is fixed to the support 59 and holds the pawl in position above a lower end portion of a sloping tag track 66 which receives tags from the orienting machine 34. The pawl 60 may function by gravity but, preferably, is urged downwardly by a suitably mounted, compressed spring 68. Fixed alongside the upper end of a movable tag track 70, which is a part of the chute 38, is a pawl-release finger 72 which, when the chute 38 is in its retracted position shown in Figs. 1 and 9, engages the underside of the pawl 60 to hold the latter in an upper position clear of tags 30 so that the latter are free to gravitate from the fixed tag track 66 to the movable tag track 70 and thence down the chute 38 to the clinching mechanism 36.

As the clinching mechanism 36, with the chute 38, commences to move forwardly in a tag-affixing operation hereinafter fully detailed, the finger 72 becomes disengaged from the pawl 60, permitting the latter to fall or, preferably, be pressed downwardly by spring 68 so that the pawl engages within the lowermost one of tags 30 then in the fixed track 66 to hold that tag and following tags against further downward movement. Upon completion of the forward movement of the clinching mechanism and the chute, the lowermost tag, then in affixing position in the clinching mechanism, is ejected by the latter upon affixation to a chicken, whereupon all tags then in the clinching mechanism and the chute slide downwardly therein to the extent of the length of one tag.

After affixation of a tag, the clinching mechanism 36 and the chute 38 retract rearwardly, whereupon the finger 72 reengages the underside of the pawl 60 to lift the latter and permit another tag to slide downwardly from the fixed track 66 into the movable track 70 to replace the tag just ejected from the clinching mechanism. A horizontal guide finger 73 is fixed to the upper end of the track 70 and slides in a guideway 75 underneath the lower end of the track 66 to maintain proper cooperative alignment of the two tracks. As hereinafter more fully detailed, the tag tracks 66 and 70 and parts of the clinching mechanism 36 are suitably grooved to accommodate the protruding portions of the tag's prongs 50 and 52 therewithin, so that the flat portion of the tag will rest directly upon and slide upon said tracks and continuations thereof in the clinching mechanism.

It is ordinarily preferred that the tag be affixed upon a fleshy portion toward one side of the chicken's breast, which, on a hanging chicken, is not too readily accessible for application of the tag thereto by a machine which operates in a horizontal direction. Therefore, if desired, a tag-clinching mechanism, hereinafter detailed, may be arranged to slide angularly upwardly as it moves forwardly to affix a tag to a chicken. However, there is some advantage in providing for the clinching mechanism to move approximately horizontally as disclosed herein, wherefore it becomes desirable for the backing mechanism 40, upon engaging a chicken, to give it a slight angular movement upwardly toward the clinching mechanism.

A chicken, moving on the conveyor 44 toward the space between the clinching mechanism 36 and the backing mechanism 40, as those mechanisms appear in Fig. 1, is first engaged, at its leading side, by said backing mechanism whereafter the chicken's continuing advance movement with the conveyor causes the chicken to turn slightly about an approximately vertical axis to present one side of the chicken to the clinching mechanism. At the same time, the moving chicken, attempting to pass the intercepting backing mechanism 40, urges the latter mechanism to one side against the force of a compression coil spring 74 and also swings angularly upwardly to some extent toward the clinching mechanism, so than a particular fleshy portion toward one side of the breast of the chicken is presented for affixation of a tag thereto.

The backing mechanism 40 consists principally of a plate 76 rigidly fixed to the lower end of a swing arm 78 by an intervening bracket 80. The swing arm is pivoted at its upper end to a bracket 82 which, by means of a screw-and-slot arrangement shown at 84 in Fig. 6, is mounted upon and is slidably adjustable horizontally and transversely of a support plate 86 which is mounted for slidable vertical adjustment within similar, opposed, upright support members 88 suitably fixed upon a floor or other foundational surface. A screw-and-slot arrangement 90 (Fig. 6), somewhat similar in principle to the arrangement 84, permits the mentioned vertical adjustment of the support plate 86. By the adjusting means described, the backing mechanism 40 may be precisely adjusted in opposition to the clinching mechanism 36 to permit proper cooperation with the latter in affixing tags to chickens.

Chickens moving toward the apparatus approach the backing mechanism from the left as viewed in Fig. 7. At the first encountered side or edge of the plate 76, the latter is provided with a roller or a plurality of rollers 92 which engage the side of an advancing chicken to aid movement of the latter to a position between the backing mechanism 40 and the clinching mechanism 36. The continued movement of the chicken brings it into contact with a roller 94 at the outer end of an operating arm 96 of the electric switch 46 to operate the latter. Wires 100, 100*a* and 100*b* connect the switch to a suitable source of electric energy as shown diagrammatically, for example, as a battery 103, and to a coil 105 of an electric solenoid which, when energized, moves a spool-type valve element 101 against the force of a compressed coil spring 107, associated with an air valve 102, which in a manner hereinafter explained, causes operation of the clinching mechanism 36 at the time when the chicken is held in place by the backing mechanism 40 for affixation of a tag thereto.

The clinching mechanism 36 is mounted upon a table or support 104 having legs 106 suitably fixed to a floor or other equivalent foundational surface. Fixed upon the forward end of the table is a pair of horizontal guides 108; and toward the rear end of the table is fixed a pneumatic cylinder 110 mounted at its forward end upon a bracket 112 fixed upon the guides 108 toward the latters' back ends, and at its rear end upon a bracket 114 fixed upon the back end of the table 104.

The valve 102 is connected by pipes 116 and 117 to opposite ends of the cylinder 110 and by a pipe 119 to a compressed air supply CA. When the switch 46 is in its normal or open condition, the solenoid coil 105 is in deenergized condition and the valve element 101 is in its leftward position as shown in Fig. 1, under which condition compressed air from the supply CA passes through the valve 102 into pipe 116 and thence to the front end of cylinder 110 to hold the piston 118 and all parts actuated thereby in their rearmost positions. The switch 46 is a time-delay switch, adapted to close upon actuation of switch arm 96 upon engagement of roller 94 by a chicken and to remain closed during the time involved in the movement of the piston 118 from its rearmost to its foremost position in cylinder 110; the arm 96 being so connected in the switch 46 as only to close said switch, but not to hold it closed.

The mentioned closing of switch 46 causes coil 105 to become energized to push valve element 101 rightwardly to its Fig. 2 position, causing valve 102 to direct compressed air from supply CA, through pipe 117, to the back end of cylinder 110, resulting in movement of piston 118 and all parts actuated thereby to their foremost or advanced positions. The maintenance of the circuit through switch 46, during such advance movement of piston 118, may be accomplished by any well-known means common to time-delay switches.

Upon expiration of the delay in reopening of switch 46, which delay ends at a time corresponding to the completion of the clinching of the tag on the chicken, as hereinafter more fully explained, the switch reopens, thereby deenergizing solenoid coil 105, whereupon spring 107 shifts the valve element 101 back to its leftward position as shown in Fig. 1, causing air from source CA to pass through the valve 102 and pipe 116 to the front of the cylinder 110 to restore piston 118 to its rearmost position in readiness for a repeat cycle of operation, air from the rear end of cylinder 110 meanwhile being vented through pipe 117, valve 102 and the latter's vent 102*a*.

The described reciprocation of the piston 118 operates through a related piston rod 120 to horizontally reciprocate a slidable cam plate 122, to the rear end of which the piston rod 120 is rigidly connected by an angle bracket 124; the forward end of the rod 120 preferably being adjustably connected to an upstanding portion of the latter bracket by opposed nuts 126.

Reciprocation of the cam plate 122 causes reciprocation of other related plates or slides which work together to cause the clinching mechanism to affix a tag to a chicken. More particularly, a substantial initial part of forward sliding movement of the cam plate 122 causes certain slidable members associated therewith to slide forwardly until a tag, carried in affixing position by the clinching mechanism, is brought to a position in which it presses against the near side of a chicken then being backed or supported by the backing mechanism 40. From that point, the cam plate 122 continues to move forwardly while certain of said other slides discontinue their forward movement.

During its continued forward movement, the cam plate operates to push further forwardly a pair of clinching jaws which engage the tag's prongs 50 and 52 to bend the latter toward and partially into the skin of the chicken and also, thereafter, to press said prongs toward each other so that they securely grasp a portion of the chicken's skin and/or flesh firmly therebetween. Retraction or rearward movement of the cam plate 122 functions to release a shutter-like retainer which theretofore has held a tag in association with the clinching mechanism, and, approximately at the same time, operates an ejecting mechanism which ejects the tag from the clinching mechanism.

With the foregoing general description of the operation of the clinching mechanism, the details of that mechanism may best be understood by reference first to Figs. 3–5 and 13–15.

Figure 15:
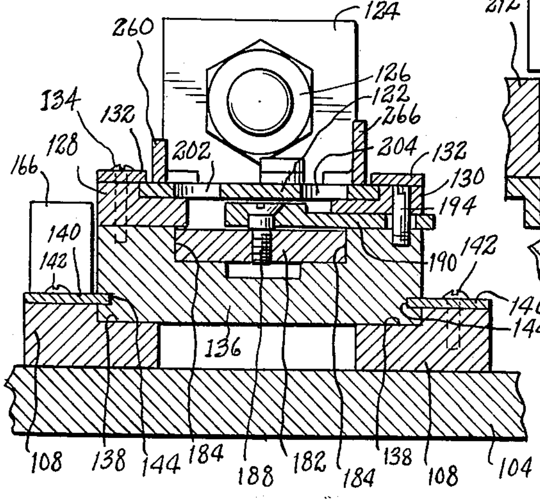
Fig. 15 is a vertical, sectional view substantially on the line 15—15 of Fig. 13, showing the relationship of certain parts for operating the mentioned jaws.

Fig. 15 illustrates an assembly of sliding members in which the cam plate 122 rests slidably in a pair of horizontal guide rails 128, 130, provided with gibs 132 which are fixed upon said guide rails by screws 134, and hold the cam plate 122 against vertical dislodgment. The screws 134 extend downwardly through said guide rails and thread into an underlying slide member 136, which is slidably mounted within rabbets 138 at the upper edges of the guides 108. Gib plates 140, fixed to the guides 108 by screws 142, have inner marginal portions protruding into grooves 144 in member 136, thereby holding the latter, and the other described members which are fixed thereon, against material vertical dislocation. It will be seen from the foregoing description that the mentioned parts 128, 130, 132 and 136 are unified and constrained to work together by the screws 134. For convenience, this unified group of members may sometimes hereinafter be referred to as the "main slide assembly," and is generally identified in the drawings by the reference character 146.

Figure 3:
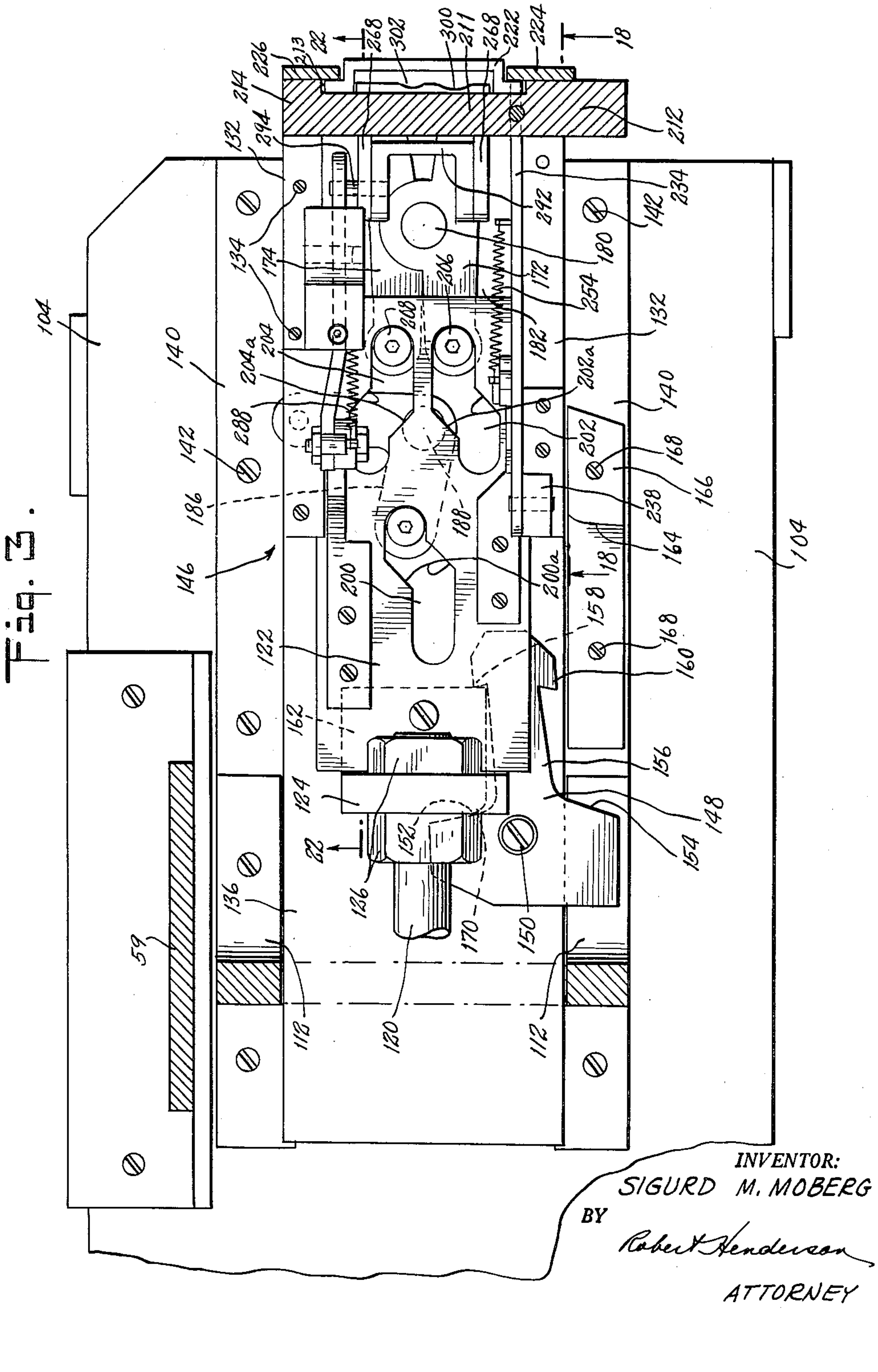
Fig. 3 is an enlarged, horizontal sectional view substantially on the irregular line 3—3 of Fig. 1, certain parts of the apparatus being shown as when in retracted or non-tag-applying position.
Figure 4:
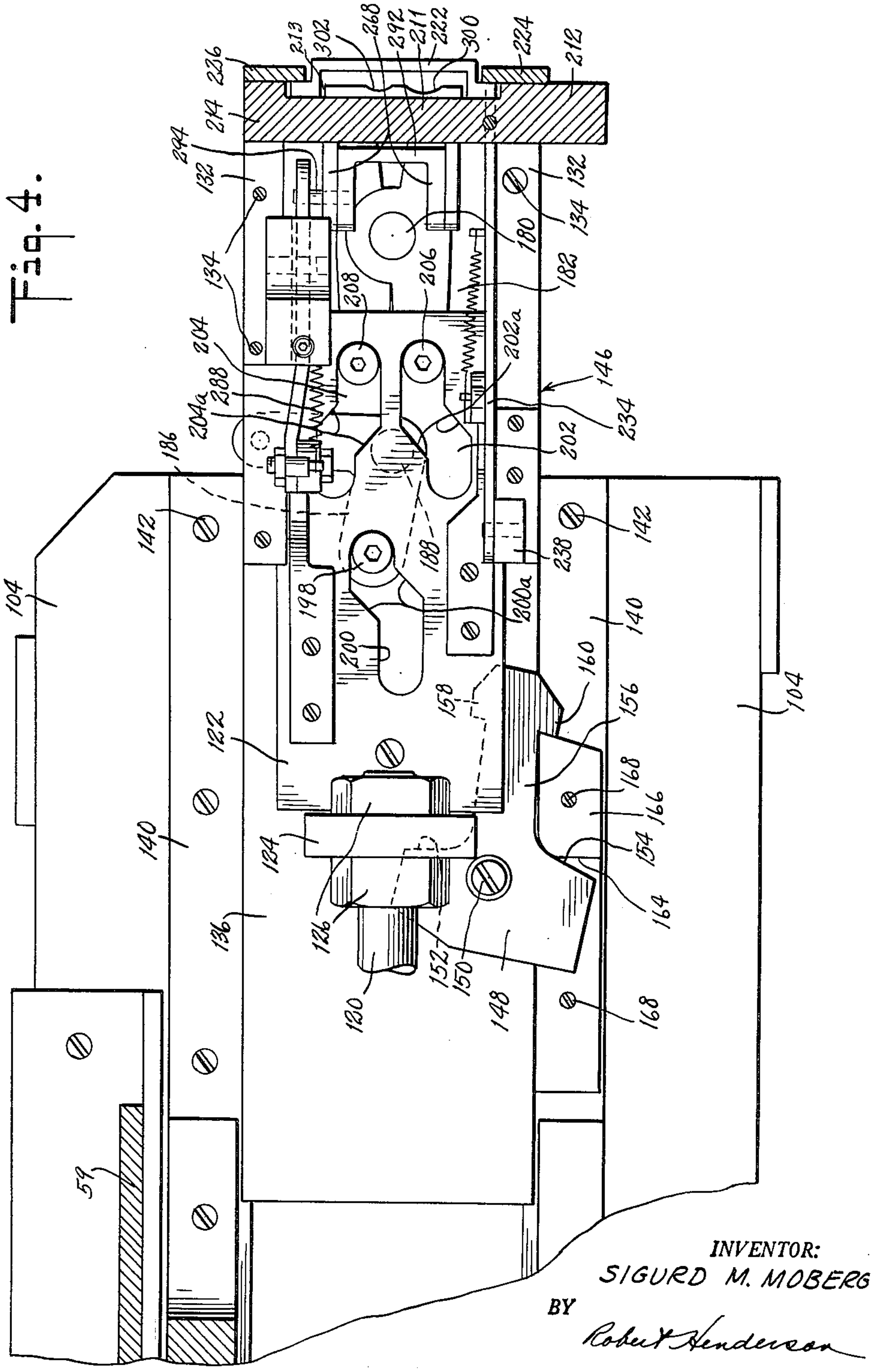
Fig. 4 is a view of the portion of the apparatus shown in Fig. 3, but with certain parts in somewhat advanced positions which they assume during operations leading to the application of a tag to a chicken.
Figure 5:
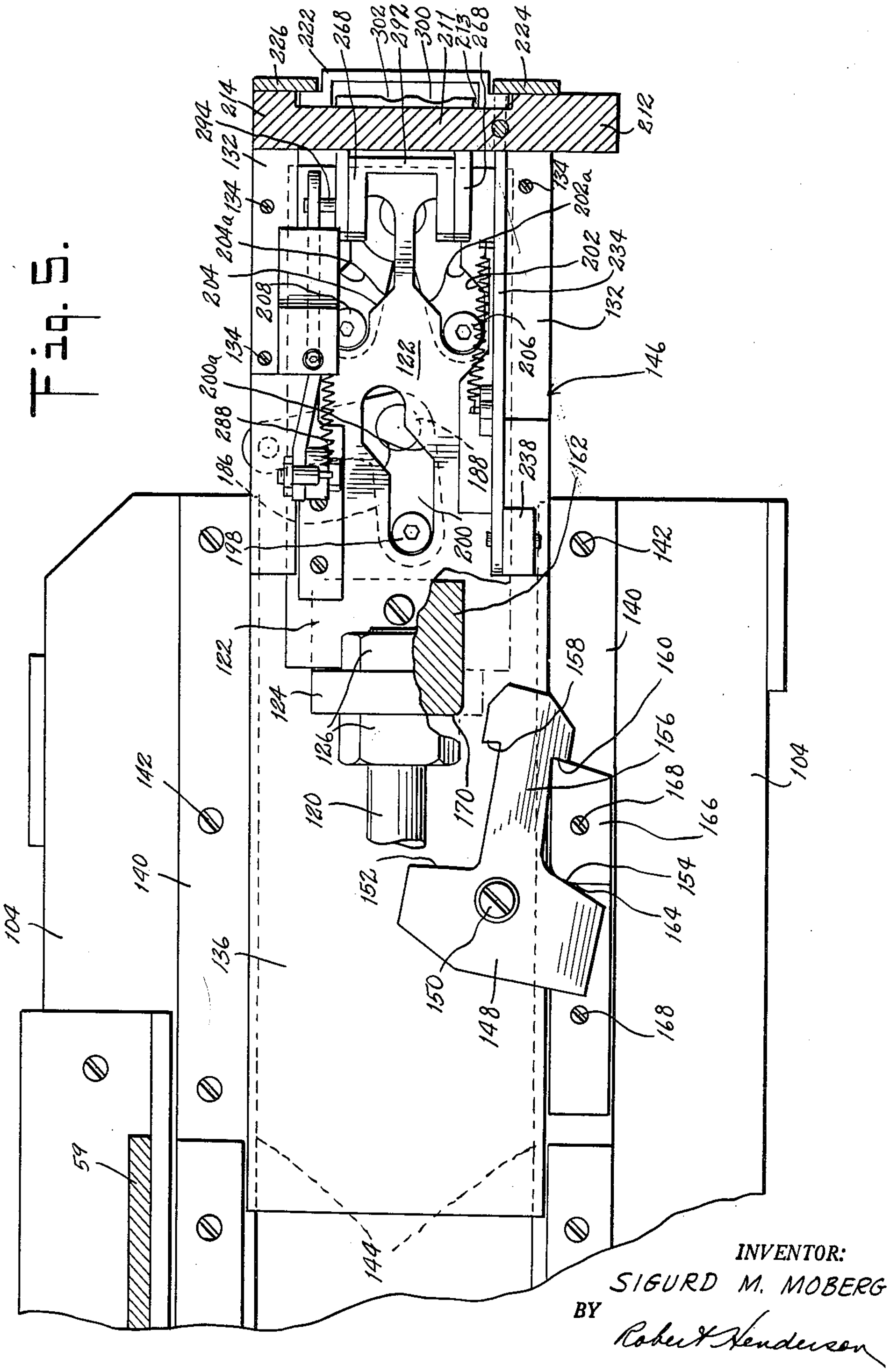
Fig. 5 is a view of the portion of the apparatus shown in Figs. 3 and 4, with certain parts in still further advanced positions which they assume during the application of a tag to a chicken.

In order to limit the movement of the main slide assembly 146 forwardly and to hold it in its extreme forward position while the cam plate 122 and other parts coacting therewith continue their forward and other movements and then pursue reverse movements, the main slide assembly 146 is provided, at a rear portion thereof, with a double-acting latch 148 which, as best shown in Figs. 3, 4, and 5, is pivotally mounted by pivot-pin 150, upon slide member 136 to operate about a vertical axis.

The latch 148 is formed with two actuating surfaces 152 and 154 extending oppositely from a latch finger 156, at opposite sides and toward the free end of which are projections or detents 158 and 160. When the piston 118, the cam plate 122 and the slide assembly 146 are in their retracted positions, as in Fig. 3, the detent 158 extends in front of a bottom portion 162 of the bracket 124, which portions underlies and is in fixed relation to the cam plate 122.

As the latch 148 is preferably pivoted to the slide member 136 rather tightly, or, i.e., in substantial frictional engagement therewith, and will not pivot except upon at least slightly forceful actuation thereof, the detent 158 remains in front of the bracket portion 162 during a substantial initial part of forward movement of the piston 118 and the cam plate 122. Thus, during such initial forward movement of the cam plate, the entire slide assembly 146 is carried forwardly until surface 154 of the latch engages a rear surface 164 of a camming block 166 which is fixed by screws 168 to the top of one of the gib plates 140 (the lower one in Figs. 3, 4 and 5).

The mentioned interengagement of the surfaces 154 and 164, with continuing forward movement of the slide assembly 146, causes the latch 148 to turn clockwisely from its Fig. 3 position to its Fig. 4 position, thereby causing detent 158 to disengage the bottom portion 162 of bracket 124 and detent 160 to move into position in front of the camming block 166. The latch 148, operated as just described, causes the slide assembly 146 to be held against further forward movement, while the disengagement of detent 158 from the bracket portion 162 enables the cam plate 122 and other parts associated therewith to continue moving forwardly with the continued forward movement of the piston 118. The effect of this continued forward movement is hereinafter more fully detailed.

After operations resulting from such continued forward movement of the cam plate 122 are completed, the piston 118 moves rearwardly with the cam plate, whereupon a rear surface 170 of the bracket's bottom portion 162 engages actuating surface 152 of the latch 148, and turns the latter counterclockwisely from its Fig. 4 position to its Fig. 3 position. This causes detent 160 to become disengaged from the camming block 166 to free the slide assembly 146 to move rearwardly and causes detent 158 to reengage the front end of the bracket's bottom portion 162, thereby leaving the latch 148 in condition to function, in the manner just described, in a further cycle of operations.

After the slide assembly 146 reaches the limit of its forward movement at which it is held by the latch 148 and camming block 166, as shown in Fig. 4, the cam plate 122, continuing its forward movement, functions to move a pair of interacting jaw arms 172, 174 forwardly to cause jaws 176, 178, at the front ends of said arms, to engage prongs 50 and 52 of a tag to bend them forwardly and to clinch them upon or into the skin of a chicken.

The jaw arms 172, 174 are pivoted together by a pivot-pin 180, fixed in and toward the forward end of a jaw-supporting slide 182 which is slidable forwardly and rearwardly in rabbets 184 formed in slide member 136 which, it will be recalled, is a part of the main slide assembly 146. The pivoting arrangement of the jaw arms 172, 174 is such that, when their rear ends are spread apart, the jaws 176, 178, move horizontally toward each other.

Toward the back end of the jaw-supporting slide 182 is pivoted a bell-crank 186 by means of a pivot-pin 188 fixed into said slide. A side arm 190 of this bell-crank extends freely into a recess 191 formed in the underside of guide rail 130; and said side arm is formed with a slightly elongate slot 192 therein toward its free end. A vertical stud 194 extends through both said guide rail and said slot and is threaded into the slide member 136. A rear arm 196 of the bell-crank 186 is provided, at its upper face and toward its free end, with a roller 198 which extends upwardly into and works within a zigzag-shaped slot 200 formed in and toward the rear end of the cam plate 122.

During the forward movement of the slide assembly 146, when the cam plate 122 is locked against movement relatively to said assembly by the latch 148, the bell-crank 186 is held in its Fig. 3 and Fig. 4 position shown in broken lines in said figures, by reason of the fact that the roller 198 then is retained within the forward end of the slot 200. However, upon continued forward movement of the cam plate, after the forward movement of the slide assembly 146 has ended, the roller 198 rolls through an intermediate angular portion 200*a* of the slot 200 to the back end of the latter.

Having in mind that, during the just-mentioned forward movement of the cam plate 122, the free end of the bell-crank's arm 190 is held against forward movement by the stud 194 in the then stationary slide assembly 146, it will be seen that such relative movement of the roller 198 from the front end to the rear end of angular slot portion 200*a* causes the bell-crank 186 to pivot counterclockwisely from its Fig. 4 position to its Fig. 5 position, said positions being shown in said figures in broken lines. This counterclockwise movement of the bell-crank, together with the mentioned retention of the end of the latter's free arm against forward movement, causes the pivot point 188 to move forwardly and thereby move the jaw-supporting slide 182 forwardly from its Fig. 13 position to its Fig. 14 position, carrying with it, of course, the jaws arms 172, 174.

During an initial part of the just-mentioned forward movement of the jaw-supporting slide 182, the jaws 176 and 178 remain open and push forwardly against the prongs 50, 52 of the tag 30 to bend those prongs toward the chicken which is then in firm intimate association with the body of said tag. Thereafter, as the roller 198, during the continued forward movement of the cam plate 122, leaves the rear end of the angular slot portion 200*a* and shifts to the back end of the slot 200, there is no further pivoting of the bell-crank 186, or further forward movement of the jaw-supporting slide 182, because of the fact that the mentioned rear portion of the slot 200 is straight and in line with the further forward movement of the cam plate 122.

Figure 14:
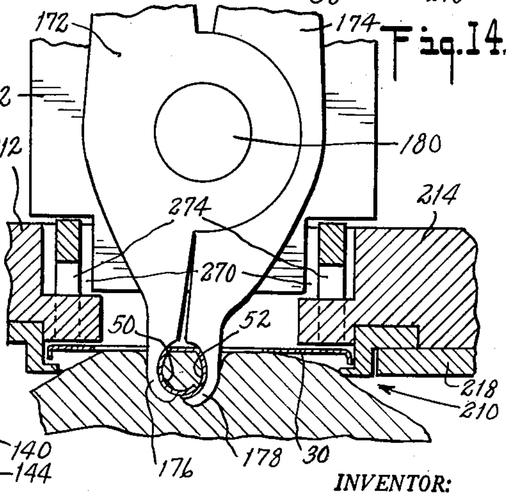
Fig. 14 is an enlarged view of the jaws shown in Fig. 13, said jaws being shown in an advanced position in which they have closed upon prongs of a tag to affix the latter to a chicken.

After the jaws 176, 178 have completed their forward movement, further forward movement of cam plate 122 operates to close those jaws to their positions shown in Fig. 14 whereby the tag's prongs 50 and 52 are pressed toward each other, with prong 50 extending partly within prong 52 and a portion of the chicken's skin or flesh held firmly within said prongs. This closing movement of said jaws is accomplished by a pair of opposed, zigzag-shaped slots 202 and 204 formed in and toward the forward end of the cam plate 122. Rollers 206, 208, fixed respectively at the rear ends of jaw arms 172 and 174, extend upwardly into and work within the slots 202 and 204 respectively.

At about the time of completion of the forward movement of the jaw-supporting slide 182 with said jaws (this time corresponding approximately to the time when roller 198 reaches the rear end of the intermediate angular portion 200*a* of the slot 200) the rollers 206, 208 will have shifted relatively to their related slots from positions at the forward ends of said slots, as in Fig. 4, to positions at the forward ends of intermediate angular portions 202*a* and 204*a* of said related slots. Thereafter, continued forward movement of the cam plate 122 causes said intermediate slot portions 202*a* and 204*a* to move the rollers 206 and 208 and, with them, the rear ends of the jaw arms 172 and 174 away from each other, thereby bringing the jaws 176, 178 together to their Fig. 14 condition. The slots 202 and 204 have short straight portions at their rear ends to assure completion of the closing of said jaws and to hold the jaws closed momentarily, concurrently with the discontinuance of forward movement of the cam plate 122 and the initiation of rearward movement of the latter.

During initial rearward movement of the cam plate 122, caused by the described time-delay opening of switch 46 and resultant operation of valve 102 and piston 118, the several slots 202, 204 and 200 operate reversely to the described forward operation thereof to open the jaws 176 and 178 and to cause the bell-crank 186 to retract the jaw-supporting slide 182 relatively to the main slide assembly 146.

At about the time that the cam plate, during its retraction movement, completes the opening of the jaws and the retraction thereof, the rear surface 170 of the bracket portion 162 engages actuating surface 152 of the latch 148 to release the latch's detent 160 from engagement with the camming block 166 and causes the detent 158 of said latch to engage the front end of the bracket's bottom portion 162 in condition for repetition of the described cycle of operations.

Although the foregoing description recites operations which occur during certain portions of the forward and rearward movements of cam plate 12, it should be understood that the latter's said movements are uninterrupted.

During the operation of various sliding members, as hereinbefore explained, to move the tag-clinching mechanism 36 up to a chicken and to advance and operate the tag-clinching jaws 176, 178, a tag 30 has been in a vertical, affixing position in a tag-holding head 210 into which it has gravitated in the chute 38, the back of said tag facing forwardly of the machine and being in contact with a chicken.

As best seen in Figs. 3–5 and 12, said tag-holding head comprises an upright plate 211, having a vertical channel 213 formed in the front thereof defining integral, opposite, upright side members 212 and 214. The plate 211 adjoins and is fixed to the lower end of the chute 38 and the channel provides a continuation of said chute to receive tags gravitating therefrom. Gibs 216, 218 are suitably fixed, by screws 219, to the chute 38 and to upper end portions of said side members to retain the tags against dislodgement from the chute and from between said side members.

Slidably mounted in the channel 213, just below the lower ends of the gibs 216, 218, is a vertically movable shutter 222 operated by means hereinafter described and held in place at opposite sides thereof by gibs 224, 226 which are held by screws 223 to the opposite, side members 212 and 214. This shutter, as best seen in Fig. 20, is in the form of a flat U in cross-section, the inside of the U providing a vertical passage permitting downward movement of tags between the shutter and the opposed front facing surface of the plate 211.

Figure 16:
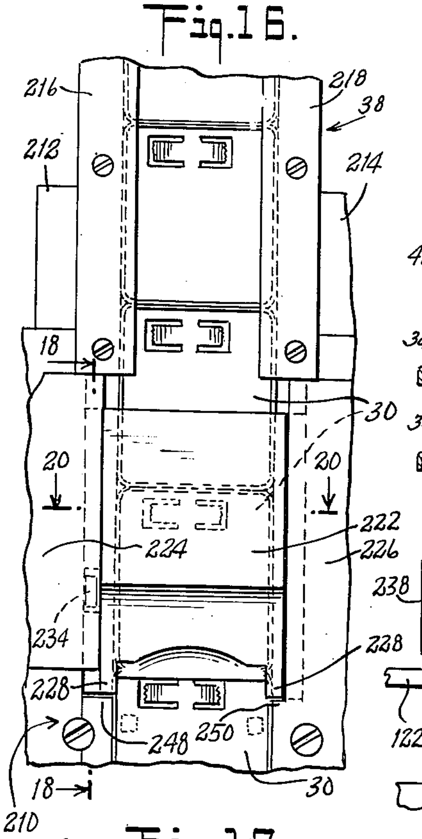
Fig. 16 is an elevational view, somewhat like Fig. 12, of the front of the tag-applying head, but including also tags which have been supplied to or are moving downwardly into said head; the lowermost tag, partially shown in this figure, being in affixing position in the head as before being affixed to a chicken.
Figure 17:
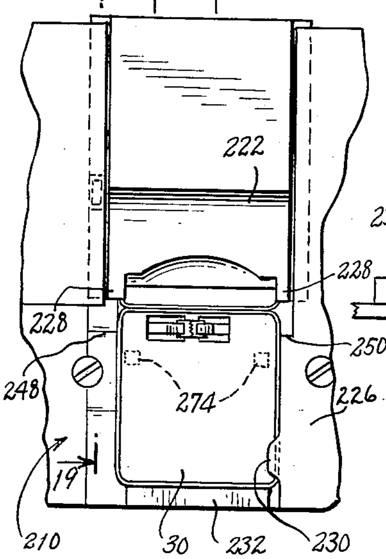
Fig. 17 is an elevational view of a lower portion of the front of the tag-applying head, showing a tag therein in affixing position with prongs of a tag closed as they would be when affixed to a chicken; adjacent parts of the chicken, however, being omitted to avoid obscuring parts of the apparatus and the tag-applying head.

Below the shutter 222, the front facing surface of the plate 211 forms a part of means for holding tags in affixing position which is the position in which the lowermost tag 30 appears in Figs. 16 and 17. Opposite, lower corners of the shutter 222 are formed with depending lugs 228 which, as best seen in Fig. 16, overlie upper corners of a tag 30, in affixing position, to hold the tag against forward movement while the prongs of the tag are being bent and clinched in the manner already described. The lower end of the gib 226 is formed with an inner, side lug 230 which overlies a side marginal portion of a lower part of a tab 30 which is in affixing position, also for the purpose of holding the tag in place during the mentioned clinching of the tag's prongs. A stationary ledge 232, protruding forwardly from and integral with the bottom of the plate 211, limits downward movement of tags to affixing position. Thus, it may be considered that the plate 211, shutter lugs 228, side lug 230, and ledge 232 constitute means for holding a tag in affixing position.

Although, as just explained, a tag is held in affixing position during the clinching of the tag's prongs upon a chicken, the tag, thereafter, must be released immediately from said affixing position and ejected from the apparatus. The release of the tag from said affixing position is accomplished by means best illustrated in Figs. 18 and 19, and ejection of the tag from affixing position is accomplished by means best illustrated in Figs. 22 and 23.

Figure 19:
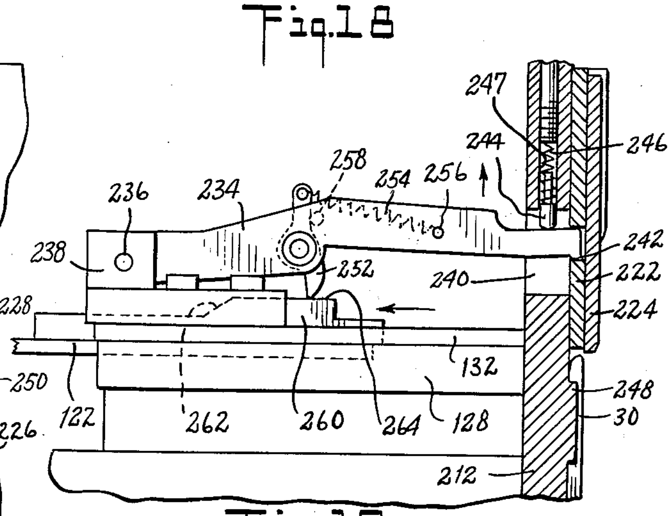
Fig. 19 is a view similar to Fig. 18 but showing the parts as with the shutter in a tag-releasing position.

Referring to Figs. 18 and 19, means disclosed therein for raising the shutter 222 to a tag-releasing position and for lowering said shutter to a tag-holding position comprise a shutter-operating arm 234, which is pivoted at point 236 at its rear end to a bracket 238 suitably fixed down upon one of the gibs 132 (the lower one of said gibs as viewed in Figs. 3, 4 and 5). The forward end of the arm 234 extends through a slot 240 in side member 212 and into a notch 242 formed in one side of the shutter 222. A plunger 244, urged downwardly by a compressed spring 246 in a vertical bore 247 in side member 212, engages the top of the front end of the arm 234 to urge the latter downwardly to an extent limited by the engagement of the lower end of the shutter 222 with stops 248 and 250, which are integral shoulders extending forwardly and inwardly, respectively, from side member 212 and gib 226.

At an intermediate point on the arm 234 is pivoted an actuating lever 252. The lever 252 is urged clockwisely, as viewed in Figs. 18 and 19, by a tensioned coil spring 254, the ends of which are connected to the upper end of lever 252 and to the arm 234 at point 256. The mentioned clockwise movement of the lever 252 is limited to its position shown in Fig. 19 by a stop pin 258 which is fixed in the arm 234.

The gib 132 and the arm 234 mounted thereon are in fixed relation to the side member 212. The arm 234 is actuated, to operate the shutter 222, by a cam member 260 which is suitably fixed down upon the cam plate 122 to reciprocate with the latter in line with the lever 252. As the cam member 260 moves forwardly with the cam plate, as in Fig. 18, during a tag-clinching operation, it engages the lower end of the lever 252, which, however, is free to turn counterclockwisely against the tension of the spring 254 so that the arm 234, at that stage of operations, remains at rest. However, upon movement of the cam plate 122 rearwardly after clinching of the tag to a chicken, a cam surface 262 of the cam member 260 engages the lower end of the lever 252, exerting a tendency to rotate that lever clockwisely. Such clockwise rotation, however, cannot be effected because of the stop pin 258; therefore, the lever 252 and, with it, the arm 234, rise to and ride upon the top surface 264 of the cam member 260; and, in thus rising, the arm 234 lifts the shutter 222 to free the clinched tag from the restraint theretofore provided by the lugs 228 of said shutter. The mentioned rearward movement of the cam member 260 with the cam plate 122 continues beyond a point at which, after ejection of the released tag, the lever 252 drops down from the top surface 264 at the forward end of the cam member, thereby permitting arm 234 to descend to lower the shutter 222 to a restraining position with respect to a next tag to be affixed to a chicken.

A clinched tag, at the instant of release thereof by the shutter 222, is momentarily held, although somewhat insecurely, by the lug 230 and also by reason of the fact that the tag's side edges are still disposed between the side members 212 and 214. To assure complete discharge of the clinched tag from the head 210 so that it may not be torn from the chicken as the latter continues its forward movement on the conveyor 44, a tag-ejecting mechanism is provided for operation by a cam member 266, which is somewhat like cam member 260 but is fixed down upon cam plate 122 at the side of the latter opposite the cam member 260.

The tag-ejecting mechanism includes similar legs 268, similarly pivoted at their knees, each within a recess 270 in plate 211. An opening 272 leads from each recess 270 to the front surface of the plate 211; and toes 274 of said legs extend through said openings. The hips of said legs are rigidly unified by a yoke or cross member 292 (Figs. 3, 4 and 5), and, at said hips, said legs are pivotally connected by a pivot-pin 294 to the forward end of a lever 276. The lever 276, at an intermediate point thereof, is pivoted to a bracket 278 which is fixed down upon one of the gibs 132 (the upper one of said gibs in Figs. 3, 4 and 5). A plunger 280, urged downwardly by a compression spring 282 in the bracket 278, presses downwardly upon the lever 276 rearwardly of the latter's pivotal connection to the bracket 278, thereby holding the lever 276 and the legs 268 normally in their positions as shown in Fig. 22, in which toe 274 is in retracted position.

Figure 22:
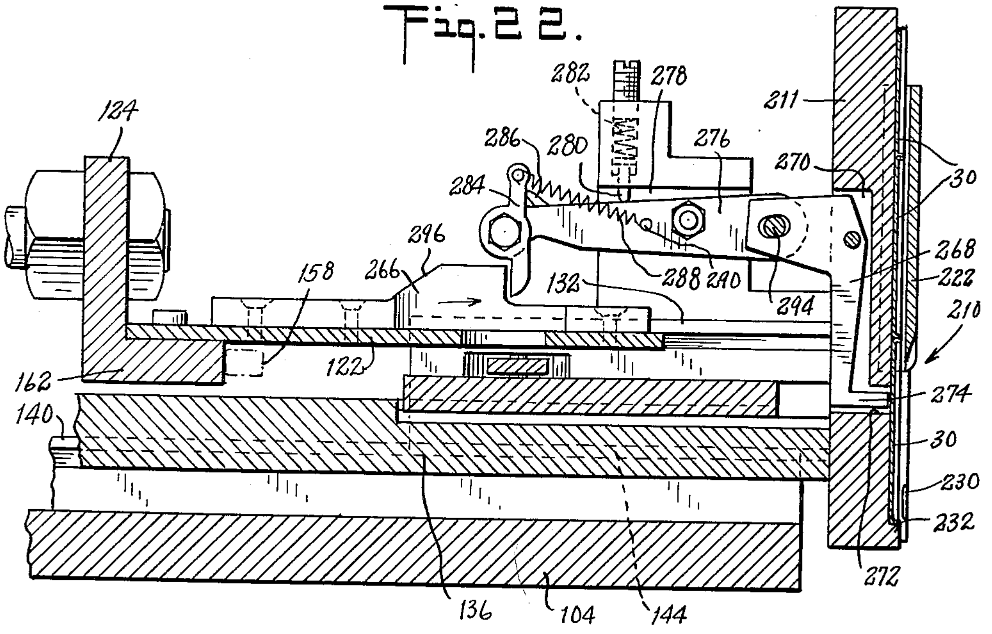
Fig. 22 is a vertical, sectional view substantially on the line 22—22 of Fig. 3 including a tag-ejecting mechanism by means of which a tag is ejected from the apparatus immediately after its affixation to a chicken, the parts being shown as during a tag-affixing operation.
Figure 23:
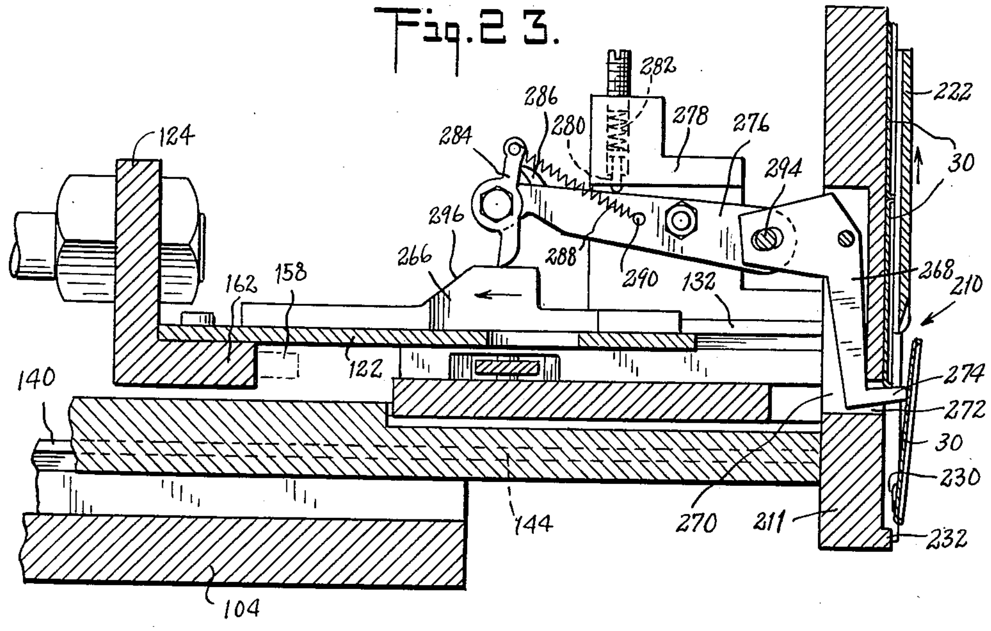
Fig. 23 is a view substantially similar to Fig. 22, but showing the parts as during a tag-ejecting operation.

At the rear end of lever 276 is pivoted another lever 284, which is limited as to clockwise movement, as viewed in Figs. 22 and 23, by a stop 286 on the lever 276, and the upper end of the lever 284 is normally held yieldably against said stop by a tensioned spring 288, the ends of which are fastened to the upper end of the lever 284 and at point 290 upon the lever 276. The forward ends of the toes 274 are shown in broken lines in Fig. 17 in back of a tag in position to be affixed to a chicken.

It may be seen from Fig. 22 that during forward movement of the cam plate 122, during a tag-clinching operation, the lever 284 is free to be turned counterclockwisely by cam member 266, so that the cam member moves underneath the rear end of the lever 276 without actuating the latter, and, during such forward movement, the cam portion of the member 266 is carried forwardly beyond the lever 284. However, upon retraction movement of the cam plate 122 and the cam member 266, following completion of a tag-clinching operation, a cam surface 296 of said cam member engages the lower end of the lever 284, and, as the latter cannot turn clockwisely because of the stop 286, said lever and, with it, the rear end of the lever 276 rise while the cam portion of the member 266 slides under and in contact with the lower end of the lever 284. This rising movement of the rear end of the lever 276 causes the forward end of the latter to move the legs 268 counterclockwisely as viewed in Figs. 22 and 23, thereby causing the toes 274 to move forwardly and press against a clinched tag to eject the latter from the clinching mechanism.

It may be noted, particularly from Figs. 3, 4, 5, 12 and 20, that the plate 211 and also the track 70 are preferably formed with similar continuing grooves 300, 302. These grooves, respectively, are shaped complementally to the prongs 50 and 52 of the tags 30 and are eccentric in the same respect as said prongs, so that if, perchance, a tag were to be presented to or received in the chute 38 from the orienting machine 34 in a position other than the correct position for its handling in the clinching mechanism, the improperly positioned tag would jam in the chute or if, in some way, it found its way past the chute to the plate 211, it would jam in or at the top of that plate. The apparatus thereby safeguards against a situation in which a tag might be improperly positioned with respect to a chicken or with respect to clinching jaws 176, 178, under which improper conditions the tag would not be fastened to the chicken and the apparatus might be damaged. Thus, the eccentric location and different sizes of the protruding parts of the prongs 50 and 52 of the tag serve not only to permit orienting of the tags by the orienting machine 34, but serve also as further assurance against possible nonoperation or mal-operation of the clinching mechanism.

Although the operation of the apparatus should be understandable from the foregoing description of the operation of the several parts thereof, the overall operation may be made somewhat clearer by the following summary of operations.

A cycle of operation may be considered as commencing with a tag 30 in affixing position in then retracted head 210, to which the tag has gravitated from orienting machine 34 by way of the chute 38. A chicken carried toward the viewer of Fig. 2 by conveyor 44 engages the backing mechanism 40 which yields somewhat to permit the chicken to become positioned between said backing mechanism and the head 210. Upon reaching that position, the body of the chicken actuates switch arm 96 to close switch 46 and thereby energize solenoid 105 to cause the latter to operate valve 102 to introduce compressed air into the back end of cylinder 110 and thereby cause piston 118 to move forwardly.

During a first part of such forward movement, the head 210 is moved from its Fig. 1 to its Fig. 2 position to engage the chicken quite firmly. In a latter part of such forward movement of the piston 118, the cam plate 122 continues moving forwardly. During this continued forward movement of the cam plate, the latter's slot 200 operates through bell-crank 186 to push jaw-supporting slide 182 forwardly with the jaw arms 172 and 174 to cause the jaws 176, 178 to push the tag's prongs 50, 52 rearwardly of the tag and partly into the chicken's skin or flesh. Immediately thereafter, the cam plate slots 202 and 204 pivot the jaw arms to cause said jaws to move toward each other to close the tag's prongs upon the skin of the chicken.

As the time-delay adjustment of switch 46 is such that the latter remains closed only for the duration of the forward movement of the piston 118, said switch opens upon the mentioned closing of the tag's prongs, thereby operating valve 102 to exhaust air from the back end of the cylinder 110 and to introduce compressed air into the forward end of said cylinder to force the piston to its rear-most position, carrying with it the cam plate 122; and, in a latter part of such retraction movement, carrying also the head 210 back to its Fig. 1 position.

During these retraction movements, the shutter 222 and the ejecting legs 268 are operated, in a manner already fully described, by the cams 260 and 266 and related levers 234 and 276 to release and eject, from the head 210, the tag that has been affixed to the chicken. The described tag-affixing operation occurs practically instantaneously; and after affixation of the tag, the chicken is moved away from the tag-affixing mechanism by the conveyor 44 which brings another chicken into place for a repetition of the described tag-affixing operation. The described retraction of the piston 118 and the parts operated thereby, leaves the mechanism in the condition as described at the beginning of the cycle, in readiness for a repeat operation in affixing a tag to a following chicken.

It should be understood that the present inventive concept may be employed in apparatus somewhat different from that shown and described herein without, however, departing from the invention as set forth in the following claims.

I claim:

1. Apparatus for applying a tag to a soft, meat-like article, comprising a tag-holding head having a forward portion adapted to engage said article, a pair of jaws associated with said head, and jaw-actuating means coacting with said pair of jaws to move the latter translationally forwardly of said head to a position in which said jaws protrude from said head and to move the jaws relatively to each other laterally of the line of forward translational movement of said pair of jaws, to cause the latter to bend the prongs of a tag held by said head and fixedly embed said prongs in said article.

2. Apparatus according to claim 1, said tag-holding head having tag-ejecting means for ejecting a tag releasably held in affixing position at said head.

3. Apparatus according to claim 2, said ejecting means comprising a pivotal leg having an end portion adapted to push a tag away from said head, and said jaw-actuating means being adapted to pivot said leg, subsequent to prong-bending movement of said jaws relatively to each other, whereby to cause said leg to eject the tag from said head.

4. Apparatus according to claim 3, said jaw-actuating means including a reciprocating cam plate movable rearwardly to open said jaws, and a cam surface on said cam plate coacting with said leg, upon rearward movement of said cam plate, to impart pivotal, tag-ejecting movement to said leg.

5. Apparatus according to claim 4, said leg having a leg-operating arm coacting therewith, said leg-operating arm having a lever pivoted thereon, limited as to pivotal movement thereof in one direction to enable said lever to coact with said cam surface to operate said leg-operating arm upon rearward movement of said cam plate, and capable of yielding pivotal movement in the opposite direction to permit forward movement of said cam plate without causing operation of said leg-operating arm.

6. Apparatus according to claim 1, said tag-holding head having tag-retaining means for releasably holding a tag in affixing position at said head, releasing means, operable subsequent to prong-bending movement of said jaws relatively to each other, for operating said retaining means to release the tag, and tag-ejecting means, operable subsequent to operation of said releasing means, for ejecting the released tag from the head.

7. Apparatus according to claim 6, further including a cam mechanism associated with said head and coacting with said releasing means and with said ejecting means to operate the two latter means to release a tag at affixing position and eject the released tag from said head.

8. Apparatus according to claim 6, said head being formed with a forwardly-facing channel to receive the tag, said tag-retaining means including a releasable shutter having a restraining portion arranged to overlie a portion of the tag to oppose dislodgment of the latter from the channel and being movable to non-overlying relationship to the tag to free the latter for dislodgment from the channel, said ejecting means including a pivotal leg having a toe portion adapted to push the tag from the head, said releasing means and said ejecting means including a lever mechanism coacting with said jaw-actuating means to operate said shutter and said leg to release a tag at tag-affixing position at said head and eject the released tag from the head.

9. Apparatus for applying a tag to a soft, meatlike article, comprising a tag-holding head having a forward portion adapted to engage said article, a pair of jaws associated with said head, and jaw-actuating means coacting with said pair of jaws to move the latter translationally forwardly of said head to a position in which said jaws protrude from said head and to move the jaws relatively to each other laterally of the line of forward translational movement of said pair of jaws, to cause the latter to bend the prongs of a tag held by said head and fixedly embed said prongs in said article, said jaw-actuating means comprising a cam member, movable forwardly relatively to said head and having cam surfaces coacting with said pair of jaws to move the latter forwardly of said head and to move said jaws relatively to each other to bend and fixedly embed the tag's prongs in the article; said apparatus further including a jaw-supporting slide upon which said jaws are pivotally mounted, said slide being forwardly slidable relatively to said head, and a bell-crank, fulcrumed upon said slide, and having one of its arms pivoted to said head; said cam surfaces partially defining slots in said cam member, and coacting with said bell-crank's other arm, with said head, and with said jaws, to pivot the bell-crank and thereby move said slide forwardly and to impart to said jaws their mentioned movement relatively to each other.

10. Apparatus according to claim 9, the bell-crank's said other arm having a portion slidable in one of the mentioned slots to pivot said other arm laterally and thereby move the jaw-supporting slide forwardly, and said jaws each having an integral arm; portions of said integral arms of the jaws being slidable in two other of the mentioned slots to operate said arms of the jaws and cause the latter to move relatively to each other.

11. Apparatus for applying a tag to a soft, meatlike article, comprising a tag-holding head having a forward portion adapted to engage said article, a pair of jaws associated with said head, and jaw-actuating means coacting with said pair of jaws to move the latter translationally forwardly of said head to a position in which said jaws protrude from said head and to move the jaws relatively to each other laterally of the line of forward translational movement of said pair of jaws, to cause the latter to bend the prongs of a tag held by said head and fixedly embed said prongs in said article, said tag-holding head having tag-retaining means for releasably holding a tag in affixing position at said head and being formed with a forwardly-facing channel to receive the tag, and said tag-retaining means including a releasable shutter having a restraining portion arranged to overlie a portion of the tag to oppose dislodgment of the latter from the channel.

12. Apparatus according to claim 11, said shutter being movable to non-overlying relationship to the tag to enable the latter to be dislodged from the channel, and the apparatus including a shutter-operating arm, coacting with said shutter and with said jaw-actuating means subsequent to prong-bending movement of said jaws relatively to each other, to move said shutter to said non-overlying relationship to the tag.

13. Apparatus according to claim 12, said jaw-actuating means including a reciprocating cam plate movable rearwardly to open said jaws, and a cam surface on said cam plate coacting with said shutter-operating arm, upon rearward movement of said cam plate, to move said shutter to said non-overlying relationship to the tag.

14. Apparatus according to claim 13, said shutter-operating arm having a lever pivoted thereon, limited as to pivotal movement thereof in one direction to enable said lever to coact with said cam surface to operate said shutter-operating arm upon rearward movement of said cam plate, and capable of yielding pivotal movement in the opposite direction to permit forward movement of said cam plate without causing operation of said shutter-operating arm.

15. Apparatus for applying a tag to a soft, meat-like article, comprising a stationary support, an orienting machine rigidly fixed upon said support, a tag-holding head mounted on said support for reciprocation between a retracted, tag-receiving position and an advanced, tag-applying position, a chute rigidly fixed to said head and separably connected to said orienting machine to guide tags gravitating from said orienting machine to said head, and an escapement mechanism, between said orienting machine and said chute, adapted to discontinue tag movement from said orienting machine upon separation of said chute from said orienting machine resulting from advance movement of said head and chute and to re-establish such tag movement upon reconnection of said chute to said orienting machine resulting from retraction movement of said head and chute.

16. Apparatus according to claim 15, said escapement mechanism comprising a tag-holding pawl, carried by said support above the path of movement of tags from said orienting machine, and a finger carried by said chute and adapted to engage said pawl and hold the latter clear of tags on said path while the chute and orienting machine are connected and to disengage said pawl to permit the latter to engage a tag on said path upon separation of the chute from the orienting machine, to hold the thus-engaged tag and following tags against movement from the orienting machine.

17. Apparatus for applying a tag to a soft, meat-like article, comprising a support, a tag-holding head mounted for forward and rearward movement on said support, a prong-clenching mechanism mounted for forward and rearward movement on and relatively to said head and operable in response to its said movement relatively to said head, an operating member reciprocable in parallelism with said movements of said head and mechanism and coacting with said head and mechanism to move said head forwardly with said mechanism to carry a tag, in said holding head, against an article for affixation thereto and to further move said mechanism forwardly relatively to said head to operate said mechanism to embed prongs of said tag into said article.

18. Apparatus according to claim 17, further including a latch, operative between said operating member and said head to constrain said member and head to move forwardly in unison prior to said further forward movement of said prong-clenching mechanism, and means for releasing said latch upon extreme forward movement of said head to enable said member to move further forwardly to operate said prong-clenching mechanism.

19. Apparatus according to claim 18, further including cam surfaces, on said support and on said operating member, adapted to engage and release said latch upon completion of forward movement of said head to permit such further forward movement of said operating member and to re-engage said latch upon completion of initial rearward movement of said operating member to initiate rearward movement of said head.

20. Apparatus for applying a tag to a soft, meat-like article, comprising a tag-holding head having a forward end adapted to hold a tag against the article, a jaw-supporting slide mounted for sliding movement rearwardly and forwardly of said head, a bell-crank fulcrumed on said slide and having a first arm pivotally connected to a fixed point at one side of said head, a pair of jaw arms pivoted upon said slide and having jaws at their forward ends, a cam plate mounted for reciprocating movement rearwardly and forwardly relatively to said head and to said slide, means for imparting such reciprocating movement to said cam plate, a projection on a second arm of said bell-crank, slidable in a first cam slot in said cam plate, adapting the latter, upon forward movement thereof, to pivot said bell-crank to move said slide and jaw arms forwardly of said head, and projections on said jaw arms, slidable in further cam slots in said cam plate, adapting the latter, upon forward movement thereof, to actuate said jaw arms and laterally move said jaws relatively to each other to cause said jaws to bend prongs of the tag into gripping relation to said article; said cam plate being adapted to cause said lateral movement of the jaws to follow said forward movement of the jaws.

21. Apparatus according to claim 20, said further cam slots being adapted to cause lateral movement of said jaws toward each other.

References Cited in the file of this patent

UNITED STATES PATENTS

| | | |
|---|---|---|
| 178,908 | Clark | June 20, 1876 |
| 187,027 | Marston | Feb. 6, 1877 |
| 427,071 | Gilbert | May 6, 1890 |
| 1,550,916 | Miller | Aug. 25, 1925 |
| 1,574,481 | Hensley | Feb. 28, 1926 |
| 1,628,848 | Kingman | May 17, 1927 |
| 2,145,461 | Smith | Jan. 31, 1939 |
| 2,470,727 | Schafroth | May 17, 1949 |
| 2,691,777 | Casper | Oct. 19, 1954 |
| 2,767,400 | Haberstump | Oct. 23, 1956 |
| 2,780,813 | Tritt | Feb. 12, 1957 |
| 2,817,840 | Dennisson | Dec. 31, 1957 |
| 2,830,295 | Dickmann | Apr. 15, 1958 |
| 2,859,445 | Larrabee | Nov. 11, 1958 |
| 2,885,681 | Dater | May 12, 1959 |
| 2,943,327 | Juilfs | July 5, 1960 |

Dedication 2,978,706.—*Sigurd M. Moberg,* Pompton Plains, N.J. TAG APPLYING APPARATUS. Patent dated Apr. 11, 1961. Dedication filed Feb. 9, 1972, by the assignee, *E. J. Brooks Company.*

Hereby dedicates to the Public the term thereof remaining after Oct. 1, 1970.

[*Official Gazette June 27, 1972.*]